United States Patent [19]
Bohan et al.

[11] Patent Number: 5,448,381
[45] Date of Patent: Sep. 5, 1995

[54] METHOD AND ASSOCIATED APPARATUS FOR PRODUCING A COLOR-BALANCED OUTPUT IMAGE IN A COLOR-BALANCING SYSTEM

[75] Inventors: Anne E. Bohan; Edward J. Giorgianni, both of Rochester, N.Y.

[73] Assignee: Eastman Kodak Company, Rochester, N.Y.

[21] Appl. No.: 283,966

[22] Filed: Aug. 1, 1994

Related U.S. Application Data

[63] Continuation of Ser. No. 85,335, Jun. 30, 1993, abandoned.

[51] Int. Cl.$^6$ .......................... G03F 3/10; G03F 3/08; H04N 1/46
[52] U.S. Cl. .................................. 358/527; 358/501; 358/504; 358/518; 358/520
[58] Field of Search ............... 358/500, 501, 504, 505, 358/506, 518, 520, 521, 523, 524, 527, 530, 537, 538; 348/223, 645, 655; 345/150, 199

[56] References Cited

U.S. PATENT DOCUMENTS

| | | | |
|---|---|---|---|
| 4,488,245 | 12/1984 | Dalke et al. | 358/520 |
| 5,267,030 | 11/1993 | Giorgianni et al. | 358/527 |

Primary Examiner—Scott A. Rogers
Assistant Examiner—Thomas D. Lee
Attorney, Agent, or Firm—Edward Dugas

[57] ABSTRACT

Methods and means are described for enhancing the visibility of small errors in color balance and color adjustments of images previewed for subsequent production. The visibility of color differences is enhanced by varying the color reproduction of a system in such a way that, for each color, the luminance and hue remain constant while the chroma is increased. The size of the increase in chroma is related to the magnitude of the initial chroma. This increase in chroma enhances the visibility of small color deviations and makes it much easier for an operator to decide whether an image is correct with respect to color balance.

19 Claims, 8 Drawing Sheets

METHOD AND ASSOCIATED APPARATUS FOR PRODUCING A COLOR-BALANCED OUTPUT IMAGE IN A COLOR-BALANCING SYSTEM

This is a Continuation of U.S. application Ser. No. 085,335, filed 30 Jun. 1993, abandoned.

TECHNICAL FIELD OF THE INVENTION

This invention relates generally to color image reproduction methods and apparatus, and more specifically to color image reproduction apparatus and associated methods which provide a video display or other imaging means for previewing a final reproduced image. Still more particularly, the invention relates to color image reproduction apparatus and associated methods which provide for adjustments of the color balance of a final reproduced image based on adjustments of a previewed image.

BACKGROUND OF THE INVENTION

Color image reproduction systems known in the art permit images to be captured by certain image-receptive media or devices, possibly digitized and stored, and then outputted onto a complementary medium. For instance, color images may be first captured on negative photographic film and then reproduced on negative photographic paper. The negative film may be printed directly onto the photographic paper, or the negative film may be photodigitized to form a digital intermediary image. In either application, the printing of the image onto the photographic paper must be controlled so as to produce prints that are properly balanced for color.

Color imaging systems in which the image passes through a digital intermediary allow adjustments to be made to the image using a single means, which may be a digital computer equipped with a suitable video display. If the video display is proceeded by the appropriate signal processing, adjustments to the density and color balance of a displayed image can be made in a way that previews corresponding adjustments to the final image produced from the digital intermediary. Similar image-previewing features can be realized on color-imaging systems in which the image does not pass through a digital intermediary. For example, an image recorded on a photographic film may be converted to a video image by analog or digital means. Adjustments may then be made to the video image, and a record of these adjustments may be retained. These adjustments can then be used to control the settings of an optical printer used to print the photographic image onto a photographic paper or other suitable image-receptive medium. Systems incorporating these features are well known to those skilled in the art.

The success of these techniques is dependent, to a significant degree, on the skill of the operator performing the adjustments. In many cases, it is difficult for an operator to notice small differences in color balance on a video display, although these differences may appear significant on the final reproduced image. Operator errors may be due to lack of skill, fatigue, and other factors such as localized chromatic adaptation. If a color-imaging system provided a means of enhancing the visibility of small color balance differences, that system would simplify the color-balancing process and provide for greater color-balance accuracy and consistency.

SUMMARY OF THE INVENTION

In view of the foregoing, an object of the present invention is to provide an improved color-imaging system.

A further object of the present invention is to provide a color-imaging system incorporating a video display or other imaging means for previewing color-balance adjustments.

A further object of the present invention is to provide a novel method and means for enhancing the visibility of color-balance differences in previewed images of color-imaging system.

To achieve these objects, the present invention provides a method and means to enhance the visibility of small color-balance differences on the previewed image. To that end, image-bearing signals from a reflection or transmission scanner, or from an electronic image-capturing or image storage device, are processed such that the chromas of certain colors important to the judgment of color-balance are enhanced in such a way so as to magnify, on the previewing device, small color-balance differences. The increased visibility of small color-balance differences simplifies the color-balancing process and provides for greater color-balance accuracy and consistency.

One preferred method of the present invention is a method for producing a color-balanced output image in a color-balancing system comprising the steps of:
 a) displaying a color image altered by modifying the chroma of selected displayed image colors;
 b) adjusting the color balance of the modified color image; and
 c) utilizing the adjustments of step b. to produce a color balanced output image.

A preferred apparatus of the present invention is an apparatus for producing a color-balanced output image in a color-balancing system comprising:
 means for displaying a color image altered by modifying the chroma of selected displayed image colors;
 means for adjusting the color balance of the modified color image to form adjustment values;
 means for storing said adjustment values; and
 means for utilizing said adjustment values to produce a color balanced output image.

The above, and other objects of the present invention, will become more apparent when taken in conjunction with the following description and drawings wherein like characters indicate like parts and which drawings form a part of the present invention.

BRIEF DESCRIPTION OF THE DRAWINGS

The invention will be described with reference to the accompanying drawings, wherein.

DETAILED DESCRIPTION OF THE INVENTION

Figure 1:
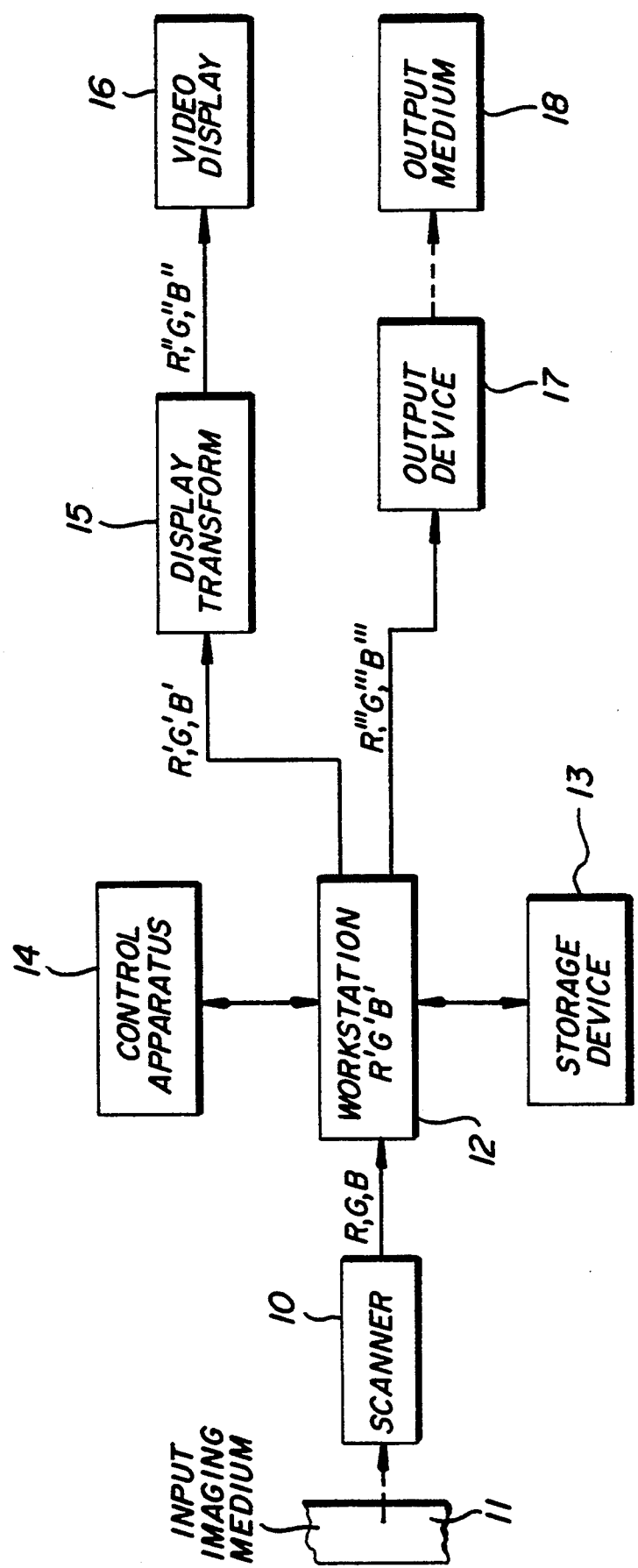
FIG. 1 is a block diagram of color reproduction apparatus in accordance with a first preferred embodiment of the invention.

FIG. 1 illustrates, in block diagram form, color image reproduction apparatus in accordance with the first preferred embodiment of the invention. Image scanner 10 serves for scanning an original image on positive or negative transmission input imaging medium 11, and for producing R,G,B (red, green, and blue) image-bearing signals for each picture element of the image being scanned. Scanner 10 may also be of the reflection type and input imaging medium 11 may also be original reflection copy. Image-bearing signals may also be derived from images captured by electronic means, such as a video camera, or from images stored by electronic image-storage devices and media. A computer-based workstation 12 receives the image-bearing signals from the scanner or electronic source and may transform the input image-bearing signals to an intermediary image data metric R', G', B'. The workstation 12 may also allow for archival storage of the intermediary image data using any of a variety of archival storage writing devices 13 and media such as magnetic tape or disk, or optical disk. The workstation 12 also provides a preview of the color reproduction of the reproduced image. For that purpose, a display-transform 15 transforms R', G', B' image-bearing signals to R", G", B" image-bearing signals appropriate for a video display 16. Video display 16 serves to display an image corresponding to the provided R", G", B" image-bearing signals (video code values). A control apparatus 14, which may include a keyboard and cursor control, enables the operator to provide image-manipulation commands, such as color-balance adjustments, pertinent to modifying the video image displayed and the reproduced image to be made or stored. An output device 17, which may be a film writer, thermal, ink-jet, electrostatic, or other type of printer or electronic output device, then receives R'", G'", B'" image-bearing signals (output-device code values) from the workstation and produces images on an appropriate image-receptive medium 18.

In order to form display-transform 15, it is necessary to specify, usually in colorimetric terms, the desired color-reproduction objective, for video display 16. For a system in which the primary use of the video display is for previewing images for color balance adjustments, the color-reproduction objective typically would be for each color on the display to match, as closely as possible, the color reproduction of the corresponding color of the final output image. However, because the color balance of certain colors (particularly neutrals, human skin tone and other relatively low-chroma colors) are especially important in judging the best overall color balance of an image, this invention instead proposes that the color-reproduction objective for the previewing display means be modified in such a way as to increase the visibility of small changes in color balance of critical colors.

To that end, display-transform 15 of this embodiment is designed to produce R", G", B" signals (video code values) such that, while most colors reproduced on the video display closely approximate the appearance of those colors in the final image that will be produced by the color-imaging system, the magnitude of small color-balance variations, of all or of certain selected colors, is enhanced so as to appear more noticeable on the video display than on the final image.

Figure 2A:
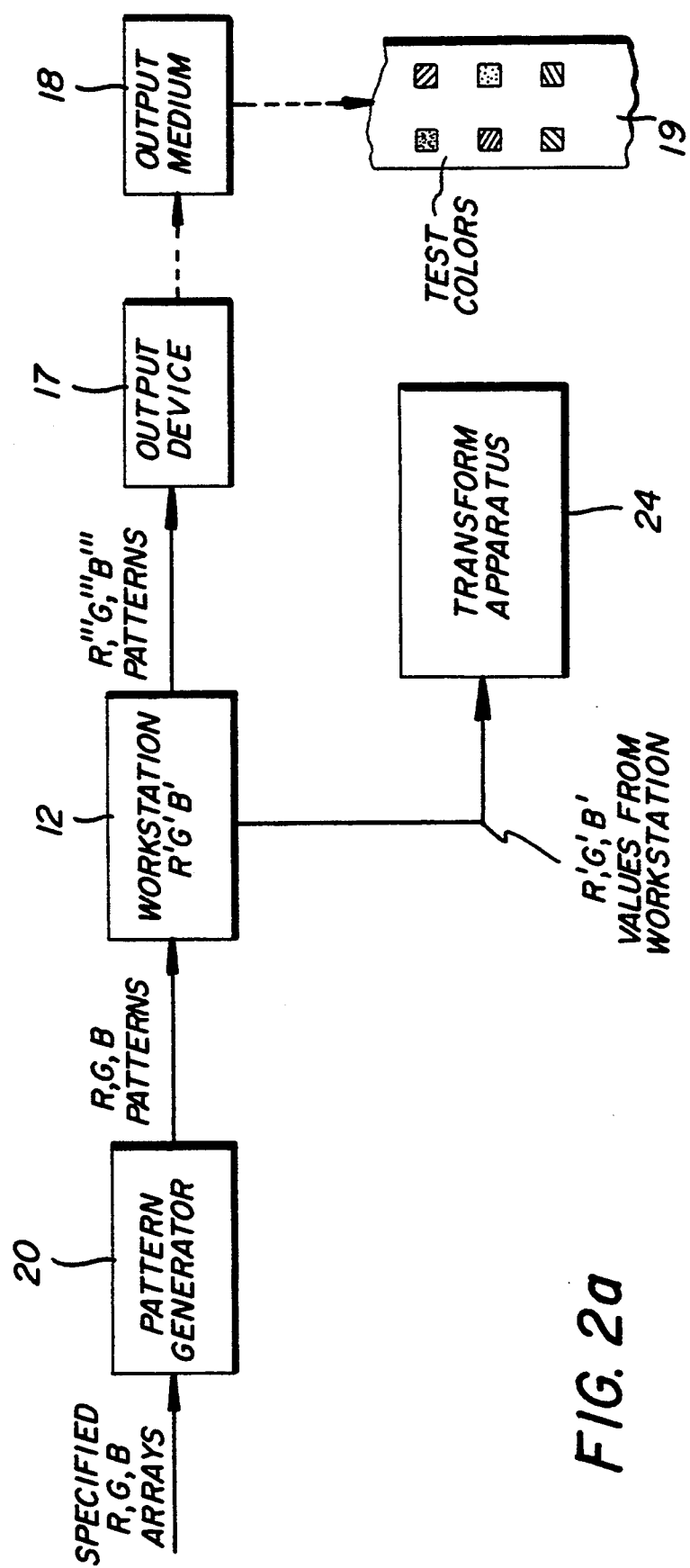
FIGS. 2a and 2b are diagrammatic illustrations in accordance with the first preferred embodiment of the invention.

Referring to FIG. 2a, test colors 19 on output medium 18 and corresponding R', G',B' values from workstation 12, required for the development of display-transform 15 consistent with the objects of this invention, may be formed by:

1) specifying arrays of R,G,B values for creating arrays of test colors on output medium 18 which adequately sample the color gamut of said output medium;
2) forming patterns of R,G,B values using pattern generator 20;
3) providing said patterns of R,G,B values to workstation 12, which generates corresponding patterns of R', G', B' and R'", G'", B'" values;
4) providing said patterns of R', G', B' values to transform apparatus 24;
5) providing said patterns of R'", G'", B'" values to output device 17;
6) writing onto output medium 18 using said patterns of R'", G'", B'"" values to form output medium test colors 19 on said output medium 18.

Figure 2B:
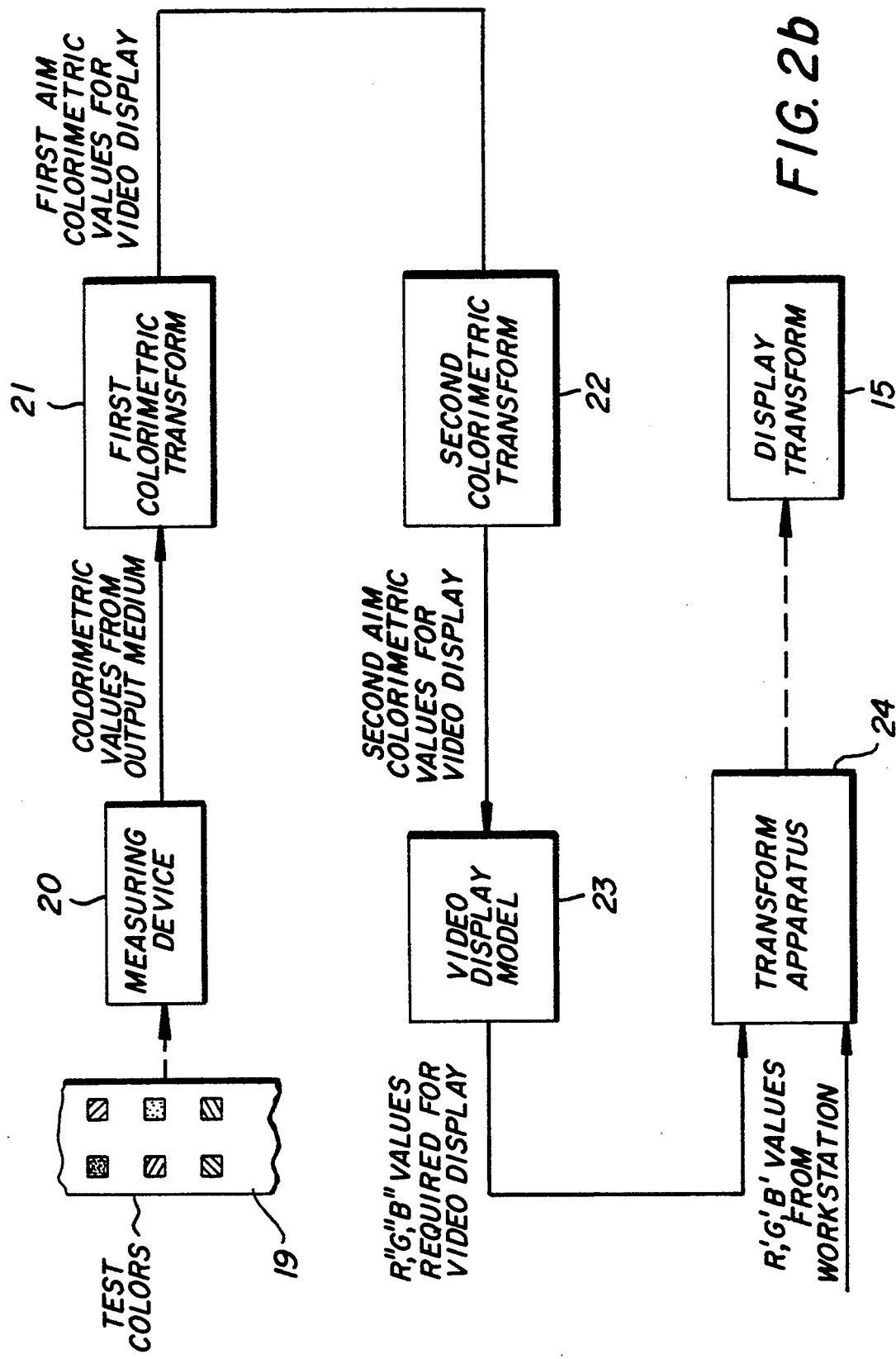

Referring to FIG. 2b, corresponding R", G", B" values, required for the development of display-transform 15 consistent with the objects of this invention, may then be formed by:

1) measuring colorimetric values of output medium test colors 19 using measuring device 20;
2) applying first colorimetric transform 21, determined by experimental or computational techniques known to those in the art, to produce first-aim colorimetric values which correspond to colorimetric values that, if produced on the video display, would result in colors that visually match said output medium test colors;
3) applying second colorimetric transform 22, determined according to the teachings of this invention, to produce second-aim colorimetric values consistent with the objects of this invention;
4) applying video display model, determined using techniques known to those skilled in the art, to determine the R", G", B" video code values needed to produce, on the video display, colors corresponding to said second-aim colorimetric values;
5) providing said R", G",B" video code values to transform apparatus 24; and
6) using transform apparatus 24 to form display transform 15 by relating said R", G", B" video code values to corresponding said R', G', B' values.

Consistent with the objects of this invention, second colorimetric transform 22 (FIG. 2b) transforms the first-aim colorimetric values for the video display in such a way that the magnitudes of color balance variations of near-neutrals and other critical colors are enhanced so as to appear more noticeable on the video display than on the final image produced by the color-imaging system. It is advantageous if the magnitudes of color-balance variations of high-chroma colors remain essentially unchanged. It is especially advantageous if the hues of all colors are unchanged by the transform.

These objectives may be achieved by transforming the first-aim colorimetric values to produce second-aim colorimetric values such that, while the aim luminances and hues remain unchanged, the chroma aim of each color is increased by an amount related to the magnitude of its first-aim colorimetric value. The following equations, expressed in 1976 CIE L*a*b* units, serve as an illustrative example of a computational implementation of these principles. In these CIELAB calculations, the chromaticities of the reference white correspond to the chromaticities of the neutral of the final image to be produced by the color-imaging system.

$L^{*\prime} = L^*$
$c^* = [a^{*2} + b^{*2}]^{\frac{1}{2}}$
$c^{*\prime} = c^* + fnc(c_{max}, c^*)$
$a^{*\prime} = a^*(c^{*\prime}/c^*)$
$b^{*\prime} = b^*(c^{*\prime}/c^*)$ wherein:

$L^*$, $a^*$, $b^*$ and $c^*$ represent the first-aim colorimetric values;

$L^{*\prime}$, $a^{*\prime}$, $b^{*\prime}$ and $c^{*\prime}$ represent the second-aim colorimetric values;

$c_{max}$ represents a maximum chroma, which may be a function of the hue angle represented by $a^*$ and $b^*$;

$fnc(c_{max}, c^*)$ = represents a change in chroma which is determined by the original chroma and $c_{max}$, for example:

$$fnc(c_{max}, c^*) = 0.004(c_{max} - c^*)_2$$

then, $$c^{*\prime} = c^* + 0.004(c_{max} - c^*)^2$$

The transformations may be implemented in the form of equations and/or three-dimensional lookup tables, although any method of translating the data in such a way as to produce the desired colorimetric transformations would suffice.

Figure 5:
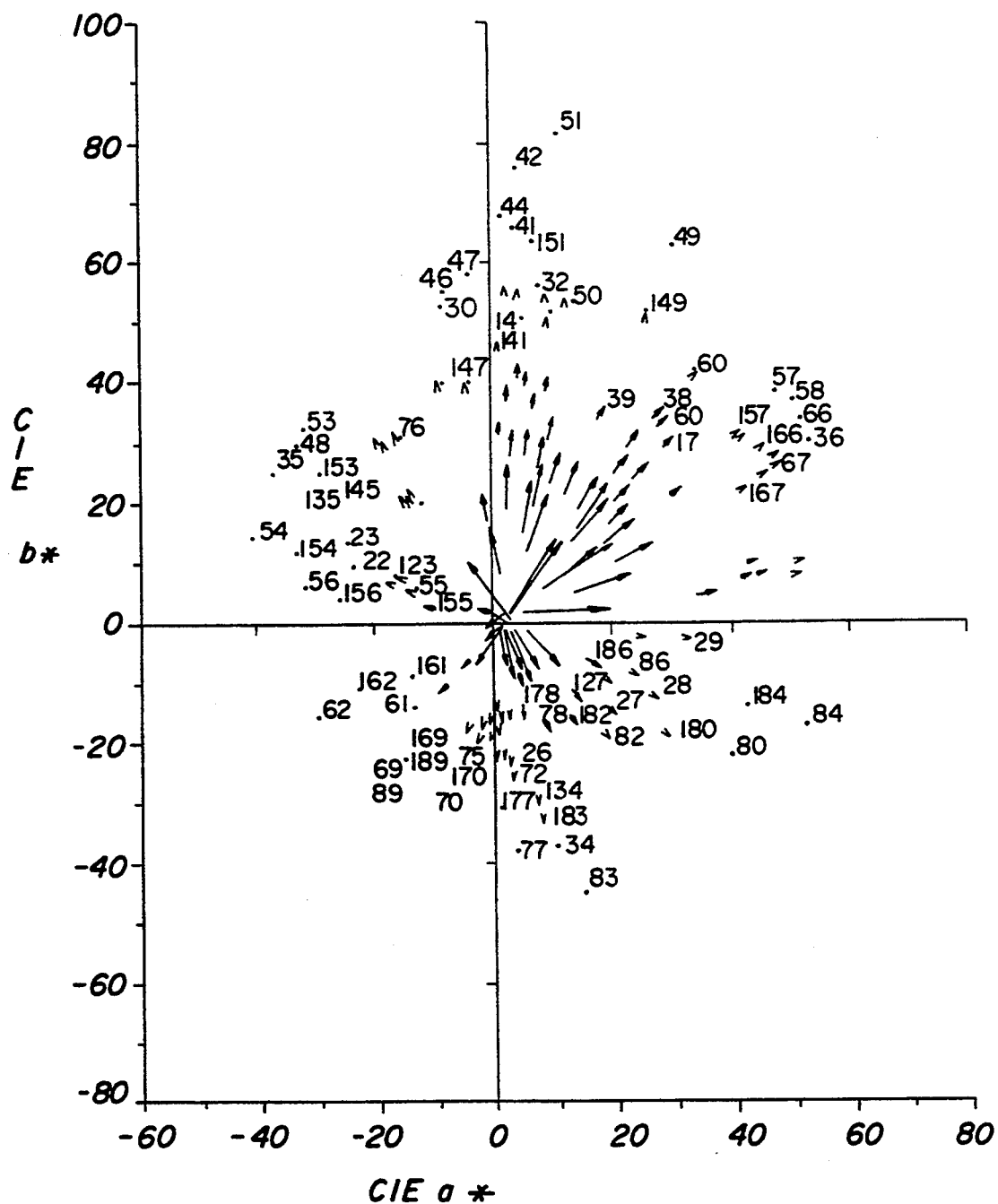
FIG. 5 is a plot of CIE a* vs CIE b* showing the enhancement in chroma of certain colors in accordance with the teachings of the invention.

FIG. 5 is a plot of CIE $a^*$ vs CIE $b^*$ showing the results of a representative transformation. In this figure, the tail of each vector arrow represents the location of a first-aim colorimetric value and the head of that vector arrow represents the location of the corresponding second-aim colorimetric value for the given color.

When transforms developed according to the teachings of this embodiment are applied to the R', G', B' signals and the resulting R'', G'', B'' signals sent to the previewing display, colors which will be low chroma on the final output will have increased chroma on the previewing display. Colors already having a high chroma will be relatively unaffected. Thus, small errors in the color-balance of the final output will show up as much larger errors on the previewing display, greatly increasing the ability of the operator to detect and correct color-balance errors.

Referring again to FIG. 1, this preferred embodiment may be practiced by first displaying on video display 16, chroma-modified preview image of an original image to be color balanced by applying display tranform 15 to the original intermediary image-bearing signals, R', G', B'. The color balance of the chroma-modified preview image is then adjusted using control apparatus 14 to determine color-balance adjustment values. The final color-balance adjustment values are then applied to the original intermediary image-bearing signals, R', G', B', to produce a color-balanced output image on output medium 18, using output device 17. In some cases, it may be advantageous to first display a non-chroma-modified image prior to displaying the chroma-modified preview image. It may also be advantageous to use this non-chroma-modified image together with the color-balance adjustments determined for the chroma-modified preview image to verify the acceptability of these adjustments as applied to a non-chroma-modified image.

Figure 3:
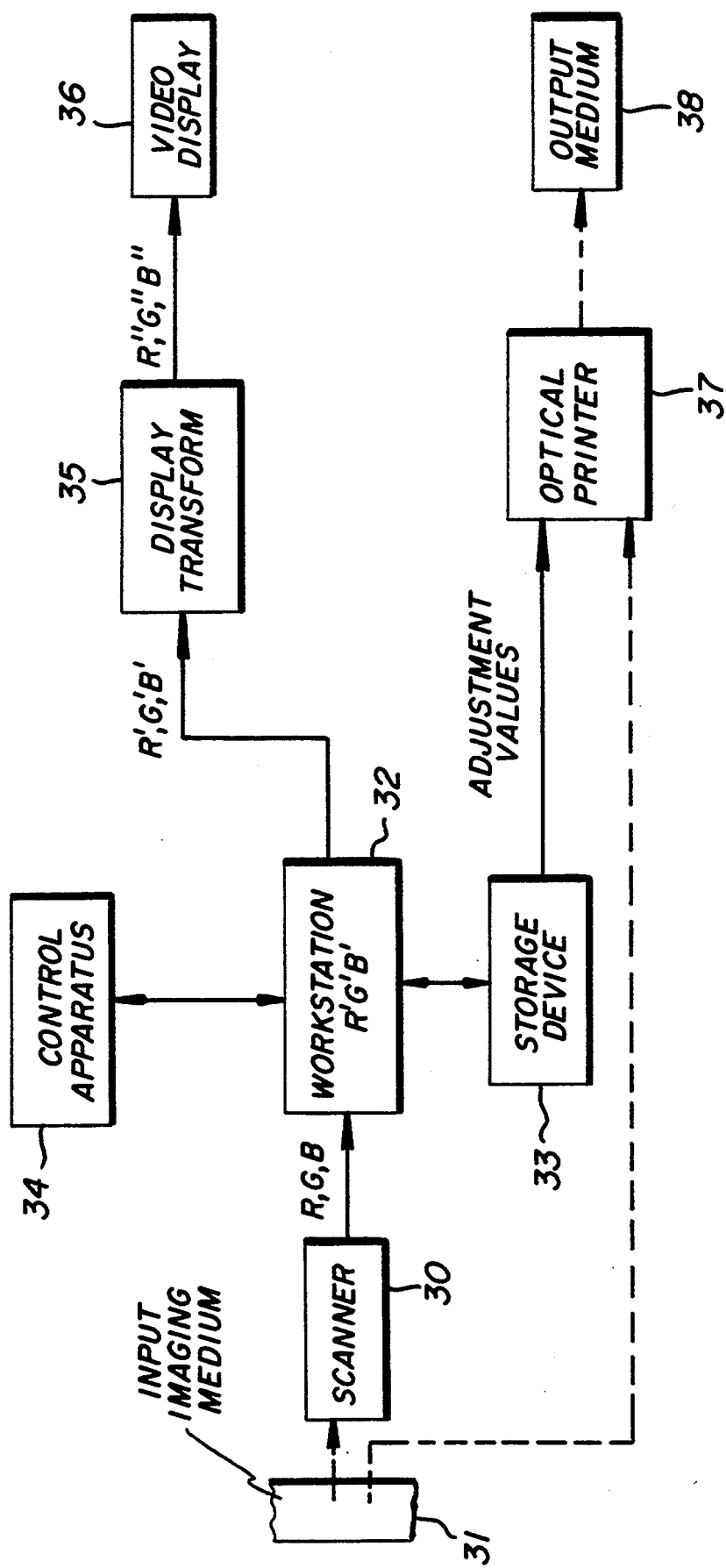
FIG. 3 is a block diagram of color reproduction apparatus in accordance with a second preferred embodiment of the invention.

FIG. 3 illustrates, in block diagram form, color image reproduction apparatus in accordance with the second preferred embodiment of the invention. An image scanner 30, serves for scanning an original image on positive or negative photographic input imaging medium 31, and for producing R,G,B image-bearing signals for each picture element of the image being scanned. A computer-based workstation 32, which receives the image-bearing signals from the scanner, may transform the input image-bearing signals into modified signals R', G',B'. Control apparatus 34, which may include a keyboard and cursor control, enables the operator to provide image-manipulation commands pertinent to modifying a video image displayed on video display 36. The workstation enables the operator to modify the color balance of the displayed image. For that purpose, video-transform 35 transforms R', G', B' image-bearing signals to R'', G'', B'' image-bearing signals. Video display 36 serves to display an image corresponding the provided R'', G'', B'' image-bearing signals. The workstation also allows for storage by storage device 33, on media such as magnetic tape or disk, of values corresponding to the final color-balance adjustments of each previewed image and for subsequent transfer of said values to optical printer 37. Optical printer 37 prints the original color negative or color positive image onto an appropriate image-receptive output medium 38 using red, green, and blue exposures adjusted according to the values transferred from storage device 33.

In this second embodiment, as in the first embodiment, the display-transform is designed to produce R'', G'', B'' signals such that, while most colors are reproduced on the video display in a way that closely approximates the appearance of those colors in the final image that will be produced by the color-imaging system, the magnitude of small color-balance variations, of all or of certain selected colors, is enhanced so as to appear more noticeable on the video than on the final image.

Figure 4A:
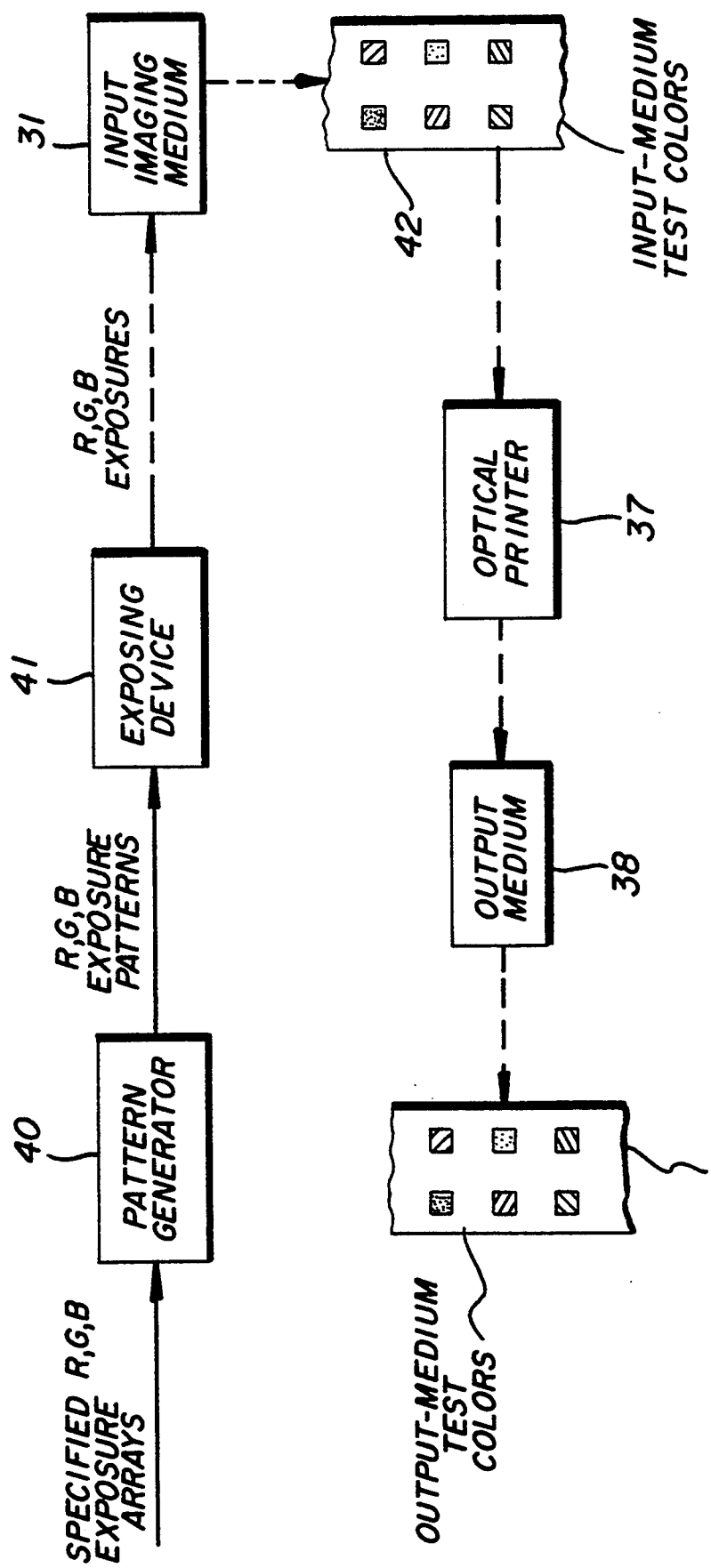
FIGS. 4a, 4b and 4c are diagrammatic illustrations in accordance with the second embodiment of the invention.

Referring to FIG. 4a, test colors on output medium 38, required for the development of display-transform 35 consistent with the objects of this invention, may be formed by:

1) specifying arrays of R,G,B exposure values for creating arrays of test colors on input medium 31 which adequately sample the color gamut of said medium;
2) forming patterns of R,G,B values using pattern generator 40;
3) providing said patterns of R, G, B values to exposing device 41, which generates patterns of exposures onto said input medium to form input-medium test colors 42 corresponding to said R,G,B exposures; and
4) printing said input-medium test colors onto output medium 38 to form output-medium test colors 43 using optical printer 37.

Figure 4B:
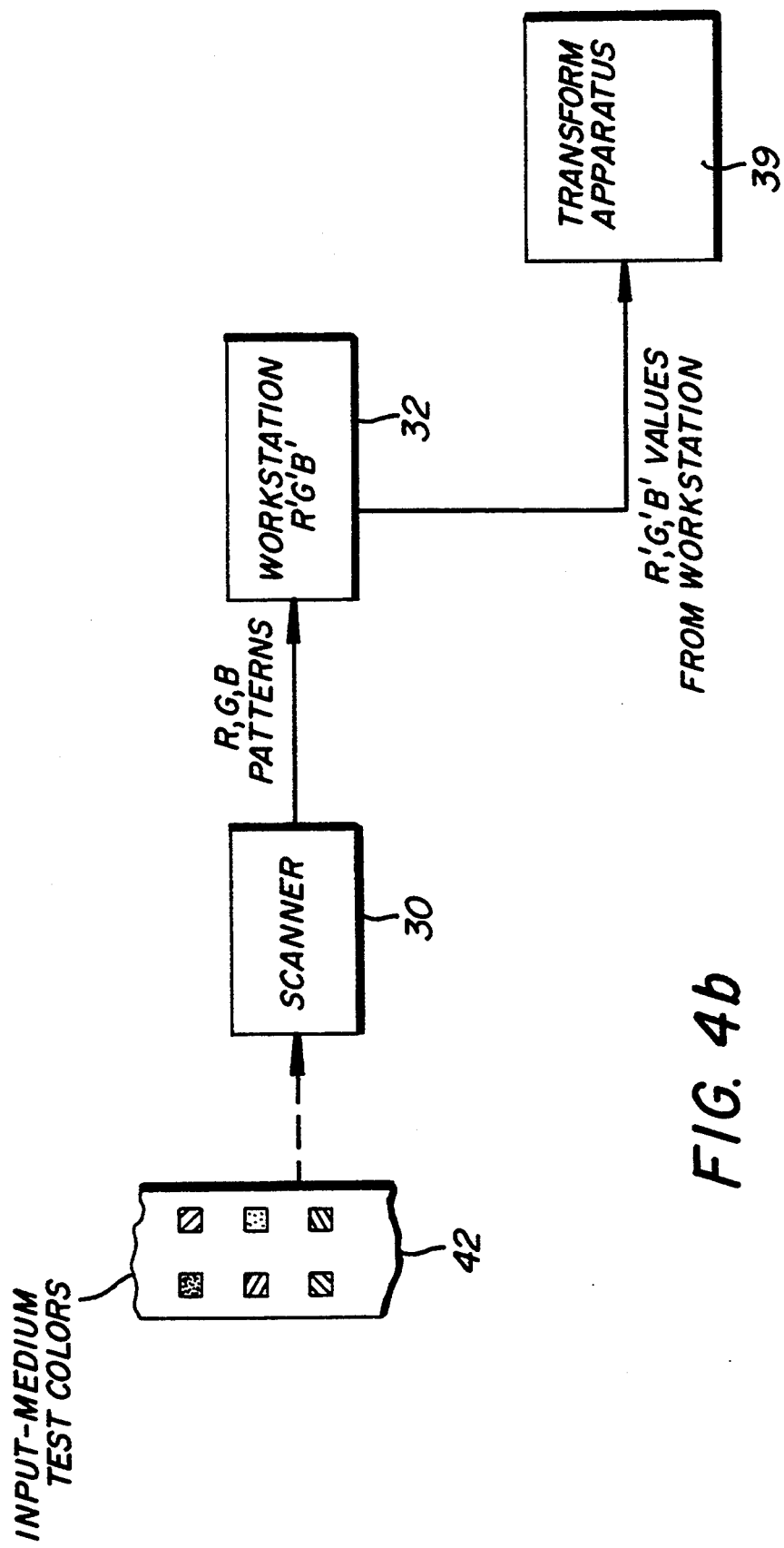

Referring to FIG. 4b, corresponding R', G', B' values, required for the development of display-transform 35, may be formed by:

1) scanning input-medium test colors 42 using scanner 30 to form patterns of R,G,B values;
2) providing said patterns of R, G, B values to workstation 32 which generates corresponding patterns of R'G'B' values; and
3) providing said patterns of R',G',B' values to transform apparatus 39.

Figure 4C:
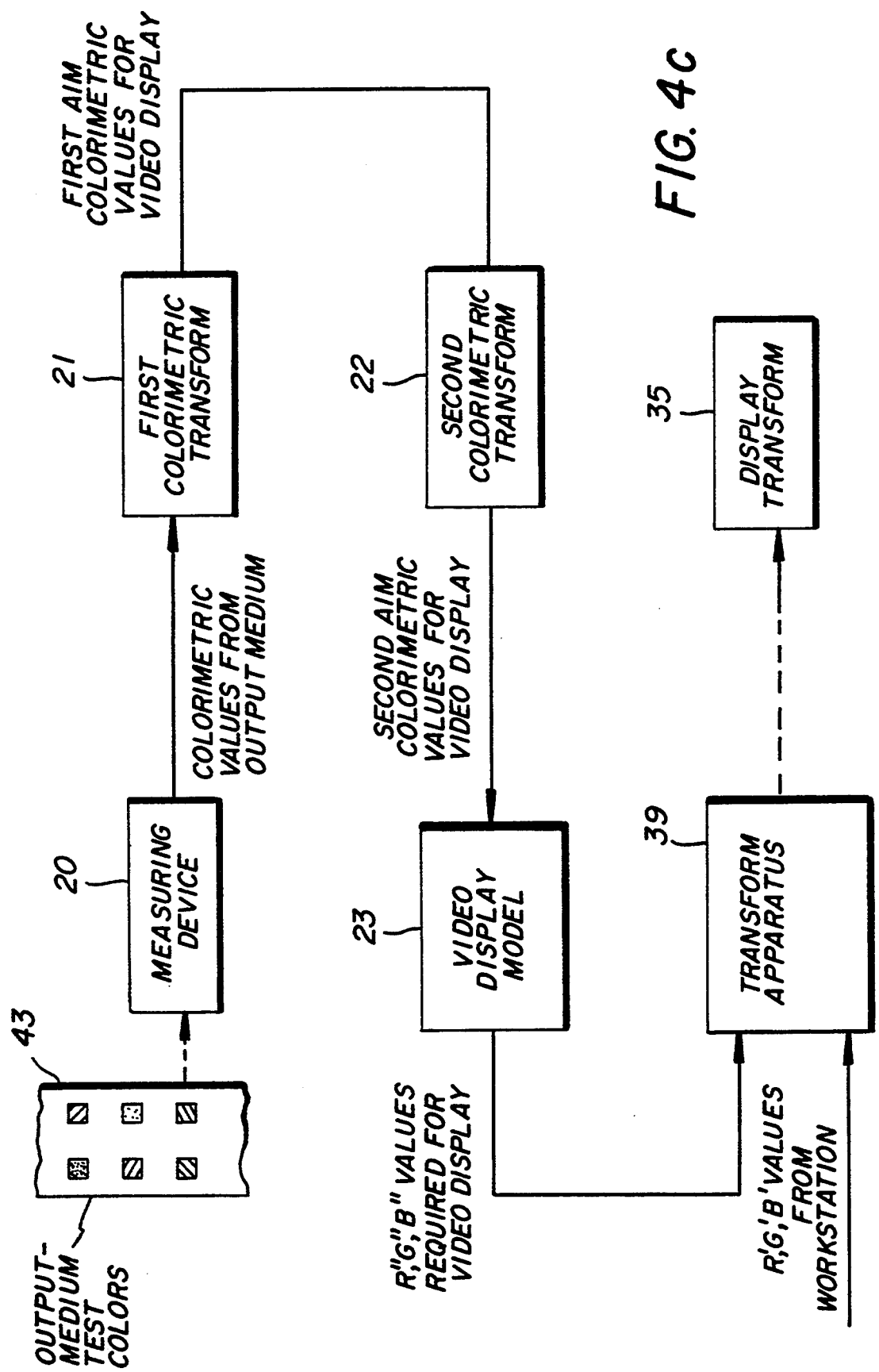

Referring to FIG. 4c, corresponding R", G", B" values, required for the development of display-transform 35 consistent with the objects of this invention, may then be formed by:

1) measuring colorimetric values of output-medium test colors 43 using measuring device 20;
2) applying first colorimetric transform 21, determined as in the first preferred embodiment by experimental or computational techniques known to those in the art, to produce first-aim colorimetric values that correspond to colorimetric values that, if produced on the video display, would result in colors that visually match said output-medium test colors;
3) applying second colorimetric transform 22, determined as in the first preferred embodiment according to the teachings of this invention, to produce second-aim colorimetric values consistent with the objects of this invention;
4) applying video display model, determined as in the first preferred embodiment using techniques known to those skilled in the art, to determine the R", G", B" video code values needed to produce, on the video display, colors corresponding to said second-aim colorimetric values;
5) providing said R", G", B" values to transform apparatus 39; and
6) using transform apparatus 39 to form display transform 35 by relating said R", G", B" values to corresponding said R', G', B' values.

When transforms developed according to the teachings of this embodiment are applied to the R', G', B' signals and the resulting R", G", B" signals sent to the previewing display, colors which will be low chroma on the optically-printed output will have increased chroma on the previewing display. Colors already having a high chroma will be relatively unaffected. Thus, small errors in the color-balance of the final output will show up as much larger errors on the previewing display, greatly increasing the ability of the operator to detect and correct color-balance errors.

Referring again to FIG. 3, such color-balance corrections may be recorded by storage device 33 as optical printer adjustments, and these adjustments may then be used to adjust the printing parameters of optical printer 37, using techniques known to those skilled in the art.

Still referring to FIG. 3, this preferred embodiment may be practiced by first displaying a chroma-modified preview image using video display 36 and display transform 35, adjusting the color balance of the chroma-modified preview image using control apparatus 34 to determine color-balance adjustment values, and using these adjustment values to produce a color-balanced output image on output medium 38 using optical printer 37. In some cases, it may be advantageous to first display a non-chroma-modified preview image prior to displaying the chroma-modified modified preview image. This can be achieved by deriving an alternate display transform 35 using the previously described techniques but eliminating second colorimetric transform. (Shown in FIG. 2b) It may also be advantageous to again use this alternate display transform, together with the color-balance adjustments determined for the chroma-modified preview image, to verify the acceptability of these adjustments as applied to a non-chroma-modified image.

ADVANTAGES OF THE INVENTION

The present invention provides a method and means to enhance the visibility of small color-balance differences and adjustments of all or certain colors on images previewed for subsequent production. The increased visibility of small color-balance changes of colors that are of particular importance in determining an optimum over-all color balance simplifies the color-balancing process and provides for greater color-balance accuracy and consistency.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Parts List:
10 Scanner
11 Input imaging medium
12 Workstation
13 Writing devices
14 Control apparatus
15 Display-transform
16 Video display
17 Output device
18 Image-receptive medium
19 Test colors
20 Measuring device
21 Colorimetric transform
22 Colorimetric transform
24 Transform apparatus
30 Image scanner
31 Input imaging medium
32 Workstation
33 Storage device
34 Control apparatus
35 Video-transform
36 Video display
37 Optical printer
38 Output medium
41 Exposing device
42 Test colors
43 Test colors

We claim:

1. A method for producing a color-balanced output image in a color-balancing system comprising the steps of:
   a) forming and displaying a preview color image of an original image to be color balanced, wherein said preview color image has been modified by applying a chroma transform to all the colors of the displayed previewed color image;
   b) forming color-balance adjustments by adjusting the color balance of said displayed preview color image; and
   c) applying said color-balance adjustments to said original image to be color balanced to produce a color-balanced output image.

2. The method according to claim 1 and further including the step of:
   applying the color balance adjustments of step b. to a displayed version of the original image to verify acceptability.

3. A method for producing a color balanced output image in a color balancing system comprising the steps of:

a) displaying an original color image that is to be color balanced;

b) forming and displaying a preview color image of an original image to be color balanced, wherein said preview color image has been modified by applying a chroma transform to all the colors of the displayed previewed color image;

c) forming color-balance adjustments by adjusting the color balance of said displayed preview color image; and d) applying said color-balance adjustments to said original image to be color balanced to produce a color-balanced output image.

4. The method according to claim 3 and further including the step of:

applying the color-balance adjustments of step (c) to the displayed original color image to verify acceptability.

5. The method according to claims 1 or 3 wherein the chroma of each displayed image color of the preview color image is transformed as a function of its initial chroma magnitude.

6. The method according to claims 1 or 3 wherein the chroma of each displayed image color of the preview color image is transformed as a function of its hue.

7. The method according to claims 1 or 3 wherein the chroma of each displayed image color of the preview color image is transformed as a function of its hue and its initial chroma magnitude.

8. Apparatus for producing a color-balanced output image in a color-balancing system comprising:

means for forming and displaying a preview color image of an original image to be color balanced, wherein said preview color image has been modified by applying a chroma transform to all the colors of the displayed previewed color image;

means for forming a color-balance adjustment values by adjusting the color balance of the displayed preview color image;

means for storing said color-balance adjustment values; and means for utilizing said color-balance adjustment values on the original image to be color balanced to produce a color-balanced output image.

9. The apparatus according to claim 8 and further comprising:

means for displaying the original image to be color balanced; and means for applying said color-balance adjustment values to said original image to verify acceptability.

10. An apparatus for producing a color balanced output image in a color balancing system comprising:

means for displaying an original color image that is to be color balanced;

means for forming and displaying a preview color image of an original image to be color balanced, wherein said preview color image has been modified by applying a chroma transform to all the colors of the displayed previewed color image;

means for forming color-balance adjustment values by adjusting the color balance of the displayed preview color image; and means for storing said color-balance adjustment values; and means for utilizing said color-balance adjustment values on the original image to be color balanced to produce a color-balanced output image.

11. The apparatus according to claim 10 and further comprising:

means for applying the color balance adjustment values to the displayed original color image to verify acceptability.

12. The apparatus according to claims 8 or 10 wherein the chroma of each displayed image color of the preview color image is transformed as a function of its initial chroma magnitude.

13. The apparatus according to claims 8 or 10 wherein the chroma of each displayed image color of the preview color image is transformed as a function of its hue.

14. The apparatus according to claims 8 or 10 wherein the chroma of each displayed image color of the preview color image is transformed as a function of its hue and its initial chroma magnitude.

15. A method for forming a display transform for producing, on a display device, a display image with enhanced visibility of color balance adjustments comprising the steps of:

A) forming test colors on an output medium by:

1) specifying arrays of image-forming values for creating corresponding arrays of output image-forming signals which will produce test colors on said output medium which adequately sample the color gamut of said output medium;

2) forming, from said arrays, patterns of image-forming values using a pattern generator;

3) providing said patterns of image-forming values to a computer workstation for generating corresponding patterns of intermediary image-forming values and corresponding patterns of output image-forming values;

4) providing said patterns of intermediary image-forming values to a transform apparatus;

5) providing said patterns of output image-forming values to an output device; and 6) writing onto said output medium using said patterns of output image-forming values to form said test colors on said output medium;

B. forming the display transform by:

1) measuring the colorimetric values of said test colors using a measuring device;

2) determining a first colorimetric transform to produce first-aim colorimetric values which correspond to colorimetric values that, when produced on the display device, would visually match said test colors;

3) determining a second colorimetric transform, to produce second-aim colorimetric values that modify the chroma of selected displayed image colors;

4) applying said first and second colorimetric transforms to the measured colorimetric values of said test colors to form second-aim colorimetric values;

5) determining the display device drive values needed to produce colors corresponding to said second-aim colorimetric values;

6) providing said display device drive values to said transform apparatus; and 7) forming the display transform, using the transform apparatus, by relating said display device drive values to corresponding said intermediary image-forming values.

16. A method for forming a display tranform for producing, on a display device, a display image with enhanced visibility of color balance adjustments comprising the steps of:

A) forming test colors on an output medium by:
1) specifying arrays of image-forming values for creating arrays of test colors on an input medium which, when subsequently applied to said output medium, adequately sample the color gaunt of said output medium;
2) forming, from said arrays patterns of image-forming values using a pattern generator;
3) providing said patterns of image-forming values to an image-forming device, which generates patterns of image-forming signals onto said input medium to form input-medium test colors; and
4) applying said input-medium test colors to said output medium to form output-medium test colors.

B) providing corresponding intermediary image-forming values for forming the display transform by:
1) scanning input-medium test colors to form patterns of image signal values;
2) providing said patterns of image signal values to a workstation which generates corresponding patterns of intermediary image-forming values; and
3) providing said patterns of intermediary image-forming values to a transform apparatus;

C) forming corresponding display image-forming values by:
1) measuring colorimetric values of said output-medium test colors using a measuring device;
2) determining a first colorimetric transform to produce first-aim colorimetric values which correspond to colorimetric values that, when produced on the display device would visually match said output-medium test colors;
3) determining a second colorimetric tranform, to produce second-aim colorimetric values that modify the chroma of selected displayed image colors;
4) applying said first and second colorimetric transforms to the measured colorimetric values of said test colors to form second-aim colorimetric values;
5) determining the display device drive values needed to produce colors corresponding to said second-aim colorimetric values;
6) providing said display device drive values to said transform apparatus; and
7) forming the display transform, using the transform apparatus, by relating said display device drive values to corresponding said intermediary image-forming values.

17. The method according to claims 15 or 16 wherein the chromas of selected displayed image colors of second-aim colorimetric values are modified as a function of their initial chroma magnitude.

18. The method according to claims 15 or 16 wherein the chromas of selected displayed image colors of second-aim colorimetric values are modified as a function of their initial hue.

19. The method according to claims 15 or 16 wherein the chromas of selected displayed image colors of second-aim colorimetric values are modified as a function of their initial hue and their initial chroma magnitude.

* * * * *